US012165567B2

(12) United States Patent
Lee et al.

(10) Patent No.: US 12,165,567 B2
(45) Date of Patent: Dec. 10, 2024

(54) DISPLAY DEVICE

(71) Applicant: LG DISPLAY CO., LTD., Seoul (KR)

(72) Inventors: Dong Kyu Lee, Paju-si (KR); Yong Won Jo, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/534,387

(22) Filed: Dec. 8, 2023

(65) Prior Publication Data

US 2024/0212576 A1 Jun. 27, 2024

(30) Foreign Application Priority Data

Dec. 26, 2022 (KR) ........................ 10-2022-0183982

(51) Int. Cl.
*G09G 3/20* (2006.01)
*G09G 3/3233* (2016.01)

(52) U.S. Cl.
CPC ......... *G09G 3/2096* (2013.01); *G09G 3/2007* (2013.01); *G09G 3/3233* (2013.01); *G09G 2300/0452* (2013.01); *G09G 2300/0819* (2013.01); *G09G 2300/0842* (2013.01); *G09G 2310/08* (2013.01); *G09G 2320/0242* (2013.01); *G09G 2320/028* (2013.01); *G09G 2320/0673* (2013.01); *G09G 2330/021* (2013.01)

(58) Field of Classification Search
None
See application file for complete search history.

(56) References Cited

U.S. PATENT DOCUMENTS

2022/0068184 A1* 3/2022 Oh ........................ G09G 3/3291
2022/0139335 A1* 5/2022 Lee ...................... G09G 3/3291
345/690
2023/0230521 A1* 7/2023 Wu ...................... G09G 3/3208
345/428

FOREIGN PATENT DOCUMENTS

KR 10-2022-0043832 A 4/2022
KR 10-2022-0059697 A 5/2022

* cited by examiner

*Primary Examiner* — Stephen T. Reed
(74) *Attorney, Agent, or Firm* — Morgan, Lewis & Bockius LLP

(57) ABSTRACT

The present disclosure relates to a display device. The display device includes: a first source driver IC configured to receive pixel data to be written into sub-pixels of a first display area and a gamma compensation voltage for each grayscale and output a data voltage to be supplied to data lines of the first display area; a second source driver IC configured to receive pixel data to be written into sub-pixels of a second display area and the gamma compensation voltage for each grayscale and output a data voltage to be supplied to data lines of the second display area; a first programmable gamma IC configured to supply a first gamma reference voltage set to the first and second source driver ICs; and a second programmable gamma IC configured to supply a second gamma reference voltage set to the first and second source driver ICs.

13 Claims, 9 Drawing Sheets

<SMODE>

DISPLAY DEVICE

CROSS-REFERENCE TO RELATED APPLICATION

This application claims priority to and the benefit of Korean Patent Application No. 10-2022-0183982, filed on Dec. 26, 2022, the disclosure of which is incorporated herein by reference in its entirety as if fully set forth herein.

BACKGROUND

1. Technical Field

The present disclosure relates to device, and particularly a display device capable of simultaneously displaying a variety of video contents having different viewing angles on a single screen.

2. Discussion of the Related Art

An organic light-emitting display device an includes an organic light-emitting diode (hereinafter referred to as "OLED") which emits light by itself, and has an advantage that its response speed is fast and its luminous efficiency, luminance, and viewing angle are large. The organic light-emitting display device has a fast response speed, excellent luminous efficiency, luminance, and viewing angle, and has excellent contrast ratio and color reproducibility since it can express black grayscales in full black.

An organic light-emitting display device does not require a backlight unit and may be implemented on a plastic substrate, a thin glass substrate, or a metal substrate that are flexible materials. Thus, a flexible display may be implemented as an organic light-emitting display device.

Recently, the in-vehicle display market has been demanding a display device with a large screen so that various video contents such as driving information and entertainment information can be simultaneously displayed on the screen.

In in-vehicle displays, research has been conducted on how to split one screen to control a part of the screen at a narrow viewing angle and another part thereof at a wide viewing angle. This technology may enable pixels with a narrow viewing angle arranged in some areas of the screen to be driven to display a private content image that can only be viewed by a specific user, and at the same time, enable pixels with a wide viewing angle arranged in other areas of the screen to be driven to display a shared content image that can be viewed by multiple users together. However, in this technology, it is difficult to adjust the viewing angle for each area of the screen as desired, and when pixels that change the viewing angle is applied, grayscale expression capability and luminance characteristics may be perceived differently in narrow and wide viewing angles. For example, in a narrow viewing angle, luminance of pixels may increase and resolution of a low grayscale may decrease.

SUMMARY

Accordingly, embodiments of the present disclosure are directed to a display device that substantially obviates one or more of the problems due to limitations and disadvantages of the related art.

An aspect of the present disclosure is to provide a display device that is capable of adjusting the viewing angle in each of the pixels and preventing image quality degradation when the viewing angle is changed.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts, as embodied and broadly described herein, a display device comprises: a display panel including first and second display areas in which a plurality of data lines, a plurality of gate lines, and a plurality of sub-pixels are disposed: a first source driver IC connected to the display panel and configured to receive pixel data to be written into sub-pixels of the first display area and a gamma compensation voltage for each grayscale and output a data voltage to be supplied to the data lines of the first display area: a second source driver IC connected to the display panel and configured to receive pixel data to be written into sub-pixels of the second display area and the gamma compensation voltage for each grayscale and output a data voltage to be supplied to the data lines of the second display area: a first programmable gamma integrated circuit (IC) configured to supply a first gamma reference voltage set to the first and second source driver ICs; and a second programmable gamma IC configured to supply a second gamma reference voltage set to the first and second source driver ICs. Each of the first and second source driver ICs outputs, as the data voltage, a voltage selected from first gamma compensation voltages for each grayscale obtained from the first gamma reference voltage set in a first mode, and outputs, as the data voltage, a voltage selected from second gamma compensation voltages for each grayscale obtained from the second gamma reference voltage set in a second mode.

Each of the sub-pixels disposed in the first and second display areas may emit light at a first viewing angle in the first mode, and emits light at a second viewing angle smaller than the first viewing angle in the second mode.

Each of the sub-pixels may include: a first light emitting element covered by a first lens: a second light emitting element covered by a second lens; and a driving element configured to drive the first light emitting element in the first mode and drive the second light emitting element in the second mode.

The first lens may include: a semi-cylindrical lens that is long in a horizontal direction and short in a vertical direction, and the second lens includes a hemispherical condensing lens.

The display device may further include a timing controller configured to transmit the pixel data to be written into the sub-pixels of the first display area to the first source driver IC, and transmit the pixel data to be written into the sub-pixels of the second display area to the second source driver IC. The timing controller may output an enable signal that controls the data voltage outputted from each of the first and second source driver ICs for each mode.

Each of the first and second source driver ICs may include: a first gamma compensation voltage generator configured to be driven in response to a first logic value of the enable signal to receive voltages of the first gamma reference voltage set and output the first gamma compensation voltages for each grayscale in the first mode, and configured to be disabled in response to a second logic value of the enable signal; and a second gamma compensation voltage generator configured to be driven in response to the second logic value of the enable signal to receive voltages of the second gamma reference voltage set and output the second gamma compensation voltages for each grayscale in the second mode, and configured to be disabled in response to the first logic value of the enable signal.

The first gamma compensation voltage generator may include: a first voltage divider circuit configured to divide the voltages of the first gamma reference voltage set inputted in the first mode and output first divided voltages; and a first gamma compensation voltage output circuit configured to receive the first divided voltages in the first mode and output the first gamma compensation voltages for each grayscale among the first divided voltages. The second gamma compensation voltage generator may include: a second voltage divider circuit configured to divide the voltages of the second gamma reference voltage set inputted in the second mode and output second divided voltages: and a second gamma compensation voltage output circuit configured to receive the second divided voltages in the second mode and output the second gamma compensation voltages for each grayscale among the second divided voltages.

The number of the first divided voltages may be greater than the number of the voltages of the first gamma reference voltage set, and the number of the first gamma compensation voltages for each grayscale may be less than the number of the first divided voltages. The number of second divided voltages may be greater than the number of the voltages of the second gamma reference voltage set, and the number of the second gamma compensation voltages for each grayscale may be less than the number of the second divided voltages.

Each of the first and second source driver ICs may include: a first voltage selector configured to output voltages of the first gamma reference voltage set from the first programmable gamma IC in response to a first logic value of the enable signal, and output voltages of the second gamma reference voltage set from the second programmable gamma IC in response to a second logic value of the enable signal; a voltage divider circuit configured to divide the voltages of the first gamma reference voltage set supplied from the first voltage selector in the first mode to output first divided voltages, and divide the voltages of the second gamma reference voltage set supplied from the first voltage selector in the second mode to output second divided voltages; a first gamma compensation voltage output circuit configured to output the first gamma compensation voltages for each grayscale among the first divided voltages in response to the first logic value of the enable signal in the first mode; a second gamma compensation voltage output circuit configured to output the second gamma compensation voltages for each grayscale among the second divided voltages in response to the second logic value of the enable signal in the second mode; and a second voltage selector configured to supply the first divided voltages to the first gamma compensation voltage output circuit in response to the first logic value of the enable signal, and supply the second divided voltages to the second gamma compensation voltage output circuit in response to the second logic value of the enable signal.

According to the present disclosure, the first and second programmable gamma ICs that output a gamma reference voltage set optimized for each mode are connected to the source driver ICs, so that the viewing angle may be adjusted in each pixel and the image quality of the display device may be prevented from degrading when the viewing angle is changed.

According to present disclosure, the data voltage optimized for grayscale expression and luminance characteristics may be supplied to the sub-pixels in each of modes having different viewing angles, thereby preventing degradation of low grayscale resolution due to an increase in luminance in a narrow viewing angle mode.

According to present disclosure, the display device can be driven with low power without deterioration in image quality because pixels are driven with data voltages optimized for each mode.

It is to be understood that both the foregoing general description and the following detailed description are exemplary and explanatory and are intended to provide further explanation of the inventive concepts as claimed.

BRIEF DESCRIPTION OF THE DRAWINGS

The above and other objects, features, and advantages of the present disclosure will become more apparent to those of ordinary skill in the art by describing exemplary embodiments thereof in detail with reference to the attached drawings, in which.

DETAILED DESCRIPTION

Figure 1:
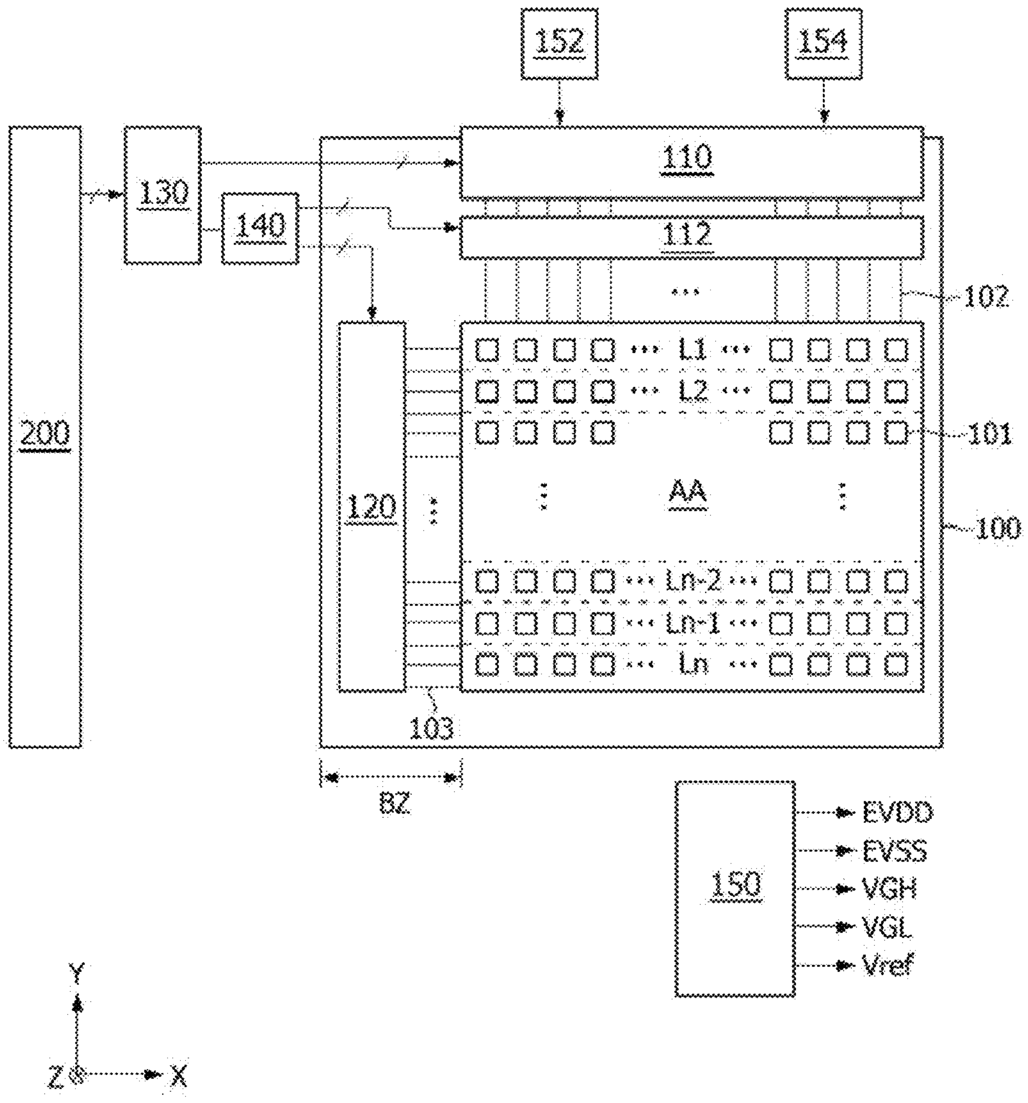
FIG. 1 is a block diagram illustrating a display device according to an exemplary embodiment of the present disclosure.

The advantages and features of the present disclosure and methods for accomplishing the same will be more clearly understood from embodiments described below with reference to the accompanying drawings. However, the present disclosure is not limited to the following embodiments but may be implemented in various different forms. Rather, the present embodiments will make the disclosure of the present disclosure complete and allow those skilled in the art to completely comprehend the scope of the present disclosure. The present disclosure is only defined within the scope of the accompanying claims.

The shapes, sizes, ratios, angles, numbers, and the like illustrated in the accompanying drawings for describing the embodiments of the present disclosure are merely examples, and the present disclosure is not limited thereto. Like reference numerals generally denote like elements throughout the present specification. Further, in describing the present disclosure, detailed descriptions of known related technologies may be omitted or may be briefly provided to avoid unnecessarily obscuring the subject matter of the present disclosure.

The terms such as "comprise", "include", "have", "contain" and "consist of" used herein are generally intended to allow other components to be added unless the more limiting terms are used with the term "only", "merely", etc. Any references to singular may include plural unless expressly stated otherwise.

Components are interpreted to include an ordinary error range or tolerance range even if not expressly stated.

When a positional or interconnected relationship is described between two components, such as "on top of", "over", "beneath", "near", "under", "above," "below," "next to," "connect or couple with/to" "crossing," "intersecting," or the like, one or more other components may be interposed between them, unless more limiting term, such as "just", "immediately" or "directly" is used or unless otherwise specified.

When a temporal antecedent relationship is described, such as "after", "subsequent", "following", "next to", "before", or the like, it may not be continuous on a time base unless a more limiting term, such as "just", "immediately" or "directly" is used.

The terms "first," "second,", "A," "B," "(a)," "(b)," and the like and the like may be used to distinguish components from each other, but the functions or structures of the components are not limited by ordinal numbers or component names in front of the components, and these components should not be interpreted to be limited by these terms as they are not used to define a particular order or precedence. For example, a first component could be termed a second component, and, similarly, a second component could be termed a first component, without departing from the scope of the present disclosure.

The following embodiments can be partially or entirely bonded to or combined with each other and can be linked and operated in technically various ways. The exemplary embodiments can be carried out independently of or in association with each other.

In the display device, a pixel circuit and a gate driving circuit may include a plurality of transistors. Transistors may be implemented as oxide thin film transistors (oxide TFTs) including an oxide semiconductor, low temperature polysilicon (LTPS) TFTs including low temperature polysilicon, or the like. Further, each of the transistors may be implemented as a p-channel TFT or an n-channel TFT.

A transistor is a three-electrode element including a gate, a source, and a drain. The source is an electrode that supplies carriers to the transistor. In the transistor, carriers start to flow from the source. The drain is an electrode through which carriers exit from the transistor. In a transistor, carriers flow from a source to a drain. In the case of an n-channel transistor, since carriers are electrons, a source voltage is a voltage lower than a drain voltage such that electrons may flow from a source to a drain. The n-channel transistor has a direction of a current flowing from the drain to the source. In the case of a p-channel transistor (e.g., p-channel metal-oxide semiconductor (PMOS)), since carriers are holes, a source voltage is higher than a drain voltage such that holes may flow from a source to a drain. In the p-channel transistor, since holes flow from the source to the drain, a current flows from the source to the drain. It should be noted that a source and a drain of a transistor are not fixed. For example, a source and a drain may be changed according to an applied voltage. Therefore, the disclosure is not limited due to a source and a drain of a transistor. In the following description, a source and a drain of a transistor will be referred to as a first electrode and a second electrode or a second electrode and a first electrode.

A gate signal swings between a gate-on voltage and a gate-off voltage. A transistor is turned on in response to a gate-on voltage and is turned off in response to a gate-off voltage.

Hereinafter, various embodiments of the present disclosure will be described in detail with reference to the accompanying drawings.

FIG. 1 is a block diagram illustrating a display device according to an embodiment of the present disclosure.

Figure 2:
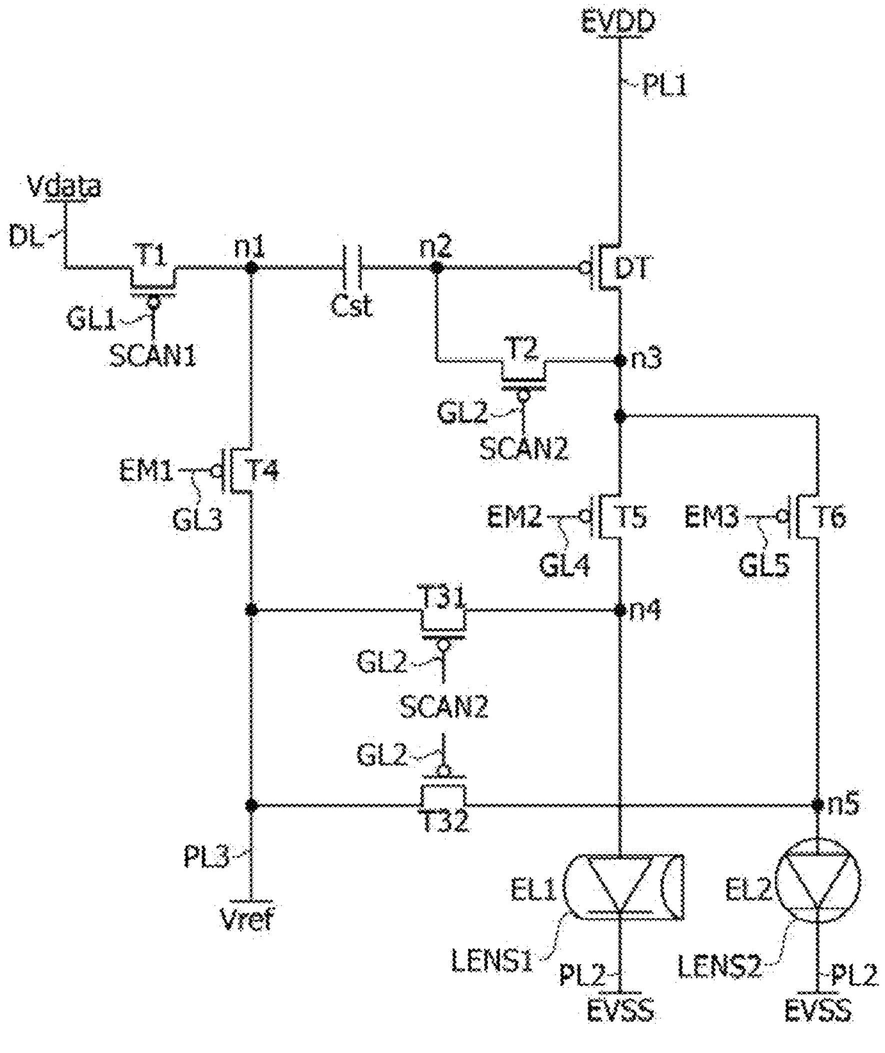
FIG. 2 is a circuit diagram illustrating a pixel circuit according to an exemplary embodiment of the present disclosure.

Referring to FIGS. 1 and 2, a display device according to an exemplary embodiment of the present disclosure may include at least a display panel 100, a display panel driving circuit for writing pixel data to pixels of the display panel 100, a power circuit 150, a first gamma voltage generator 152, and a second gamma voltage generator 154, and the like. A display device might include other elements not shown in the Figure.

The display panel 100 may be a panel having a rectangular shape with a length in the X-axis direction and a width in the Y-axis direction, but is not limited thereto and may be a panel of other shapes. As an example, the display panel 100 may be a panel having a rectangular structure with a length in the Y-axis direction, a width in the X-axis direction. As another example, the display panel 100 may be a panel having a structure of any shape such as a square shape, a circle shape, an oval shape, etc. A display area AA on the display panel 100 may include a pixel array for displaying an input image thereon. The pixel array includes a plurality of data lines 102, a plurality of gate lines 103 intersecting the data lines 102, and pixels 101 which are disposed in a matrix form at intersections of the plurality of data lines 102 and plurality of gate lines 103. The display panel 100 may further include power lines (e.g., commonly) connected to the pixels 101. The power lines are connected to constant voltage nodes of the pixel circuits and supply a constant voltage necessary for driving the pixels 101 to the pixels 101. The display panel 100 may further include other lines such as reference lines, touch lines, scanning lines, etc.

Each of the pixels 101 may be divided into a red sub-pixel, a green sub-pixel, and a blue sub-pixel for color implementation. Each of the pixels may further include a white sub-pixel or include sub-pixels of other colors such as cyan, magenta, or yellow, etc. Each of the sub-pixels includes a pixel circuit for driving a light-emitting element. Each of the pixel circuits may be connected to data lines, gate lines, power lines and the like. Hereinafter, "pixel" and "subpixel" may be used interchangeably.

The pixels may be disposed as real color pixels and/or pentile pixels. A pentile pixel in which the pixels are disposed in dot shapes may realize a higher resolution than the real color pixel by driving two sub-pixels having different colors as one pixel 101 through the use of a preset pixel rendering algorithm. Pixel rendering algorithms may compensate for insufficient color representation in each pixel with the color of light emitted from an adjacent pixel.

The pixel array may include a plurality of pixel lines LI to Ln. Each of the pixel lines LI to Ln includes one line of pixels arranged along the line direction (e.g., X-axis direction) in the pixel array of the display panel 100. As an example, sub-pixels arranged in one pixel line share the gate lines 103. Sub-pixels arranged, for example, in the column direction Y along a data line direction share the same data line 102. As an example, one horizontal period is a time obtained by dividing one frame period by the total number of the pixel lines LI to Ln, without being limited thereto.

The display panel 100 may be implemented as a non-transmissive display panel or a transmissive display panel.

The transmissive display panel may be applied to a transparent display device in which an image is displayed on a screen and an actual background is visible. The display panel 100 may be manufactured as a flexible display panel or a non-flexible display panel. The flexible display panel may be implemented as an OLED panel using a polymer substrate made of any one of polyethylene terephthalate (PET), polycarbonate(PC), acrylonitrile-butadiene-styrene copolymer(ABS), polymethyl methacrylate(PMMA), polyethylene naphthalate(PEN), polyether sulfone(PES), cyclic olefin copolymer(COC), triacetylcellulose(TAC) film, polyvinyl alcohol(PVA) film, polyimide(PI) film, and polystyrene(PS), which is only an example and is not necessarily limited thereto, but is not limited thereto.

The power circuit 150 may adjust the level of a DC input voltage applied from an external device such as a host system 200 to output a first voltage VI required to drive the pixel array of the display panel 100 and the display panel driving circuit. The power circuit 150 may include a DC-DC converter. The DC-DC converter may include a charge pump, a regulator, a buck converter, a boost converter, and/or the like. The power circuit 150 may output constant voltages (or DC voltages) such as a gamma reference voltage VGMA, a gate-on voltage VGL (for a p-channel transistor), a gate-off voltage VGH (for a p-channel transistor), a pixel driving voltage EVDD, a cathode voltage EVSS, a reference voltage Vref, an IC driving voltage of a pixel driving circuit through the DC-DC converter, etc. The gate-on voltage VGL and gate-off voltage VGH are supplied to a level shifter 140 and a gate driver 120. Voltages such as the pixel driving voltage EVDD, the cathode voltage EVSS, and the reference voltage Vref are supplied to pixels 101 via power lines connected to the pixels 101 in common.

The first gamma voltage generator 152 may output gamma reference voltages (hereinafter referred to as "first gamma reference voltage set") for a first mode having different voltage levels. The first gamma reference voltage set may include N (for example, N being a positive integer between 8 and 12 such as 10) gamma reference voltages of the data voltage for which grayscale expressive power and luminance value are optimized for each grayscale when the pixels 101 are driven in the first mode. Each of the voltages in the first gamma reference voltage set may be divided by a voltage divider circuit of a data driver 110 as an example, and among the divided voltages, a gamma compensation voltage for each grayscale may be acquired by for example selection according to digital data (hereinafter referred to as "voltage data") stored in a register of the data driver 110 for example. The voltage data stored in the register of the data driver 110 indicates the voltage level of each grayscale, and may be updated through a communication interface such as I2C, a serial peripheral interface (SPI) or the like.

The second gamma voltage generator 154 may output a set of gamma reference voltages (hereinafter referred to as "second gamma reference voltage set") for a second mode having different voltage levels. The second gamma reference voltage set may include gamma compensation voltages for each grayscale for which grayscale expressive power and luminance value are optimized for each grayscale when the pixels 101 are driven in the second mode. Each of the voltages in the second gamma reference voltage set is divided by the voltage divider circuit of the data driver 110 as an example, and among the divided voltages, the gamma compensation voltage for each grayscale may be acquired by for example selection according to the voltage data stored in the register of the data driver 110 for example. The voltage data stored in the register of the data driver 110 indicates the voltage level of each grayscale, and may be updated through the communication interface such as $I^2C$, a serial peripheral interface (SPI) or the like.

Each of the pixels 101 may emit light at a wide viewing angle in the first mode, while emitting light at a viewing angle smaller than that of the first mode, i.e., a narrow viewing angle, in the second mode. Alternatively, each of the pixels 101 may emit light at a wide viewing angle in the second mode, while emitting light at a viewing angle smaller than that of the second mode, i.e., a narrow viewing angle, in the first mode.

The first and second gamma voltage generators 152 and 154 may be implemented with programmable gamma integrated circuits (IC) in which the voltage level of an output voltage is varied depending on the voltage data stored in the register. The timing controller 130, the host system 200, or a separate external device may update the voltage data stored in the register of each of the first and second gamma voltage generators 152 and 154 through a communication interface.

The display panel driving circuit may write the pixel data of an input image to the pixels 101 of the display panel 100 under the control of the timing controller 130. The display panel driving circuit may at least include the data driver 110 and the gate driver 120. The display panel driving circuit may further include a demultiplexer array 112 disposed between the data driver 110 and the data lines 102, without being limited thereto.

The demultiplexer array 112 may utilize a plurality of demultiplexers (DEMUX) to sequentially supply data voltages outputted from the channels of the data driver 110 to the data lines 102 using a plurality of demultiplexers. Each of the demultiplexers may include a plurality of switch elements, for example, disposed on the display panel 100. When the demultiplexers are disposed between the output terminals of the data driver 110 and the data lines 102, the number of channels of the data driver 110 may be reduced. For example, the demultiplexer may time-divisionally distribute the data voltage Vdata output through the channels of the data driver 110 to the plurality of data lines DL. However, the present disclosure is not necessarily limited thereto, and the demultiplexer array 112 may be omitted.

The display panel driving circuit may further include a touch sensor driver for driving touch sensors. The touch sensor driver is omitted in FIG. 1. The data driver 110, the timing controller 130, the power supply 140, and/or the touch sensor driver may be integrated into a single source driver IC.

The data driver 110 may receive the pixel data of the input image received as a digital signal from the timing controller 130 and output the data voltage. The channels of the data driver 110 include a digital to analog converter (DAC). Under the control of the timing controller 130, the data driver 110 may supply the gamma compensation voltage for each grayscale obtained from the first gamma reference voltage set to a digital to analog converter (hereinafter referred to as "DAC") arranged for each channel of the data driver 110 in the first mode. Under the control of the timing controller 130, the data driver 110 may supply the gamma compensation voltage for each grayscale obtained from the second gamma reference voltage set to the DACs in the second mode. That is, the gamma compensation voltage for each grayscale is provided to the DAC in the data driver 110. The data voltage is output via, for example, an output buffer from each of the channels of the data driver 110.

The data driver 110 samples and latches the pixel data on the basis of the data timing control signal DDC supplied from the timing controller 130, and then inputs the pixel data to the DAC disposed for each channel. In the first mode, the DAC converts the pixel data into the gamma compensation voltage for each grayscale obtained from the first gamma reference voltage set and outputs the data voltage. In the second mode, the DAC converts the pixel data into the gamma compensation voltage for each grayscale obtained from the second gamma reference voltage set and outputs the data voltage.

The data driver 110 may be integrated into a source driver IC. The data lines of the display panel 100 may be driven by one or more source driver ICs.

Each of the channels of the data driver 110 may be driven in the first mode or the second mode under the control of the timing controller 130 to output the data voltage of the pixel data. For this purpose, the first gamma reference voltage set outputted from the first gamma voltage generator 152 may be supplied to the DAC of the channel driven in the first mode, and the second gamma reference voltage set outputted from the second gamma voltage generator 154 may be supplied to the DAC of the channel driven in the second mode.

The DAC of the channel driven in the first mode may generate by for example selection the gamma compensation voltage corresponding to the grayscale value of the pixel data inputted as a digital signal from a latch and output the generated gamma compensation voltage as the data voltage. The data voltage obtained from the voltages of the first gamma reference voltage set is then supplied to the pixels 101 driven in the first mode via the data line 102. The DAC of the channel driven in the second mode may generate by for example selection the gamma compensation voltage corresponding to the grayscale value of the pixel data from a latch and outputs the generated gamma compensation voltage as the data voltage. The data voltage obtained from the voltages of the second gamma reference voltage set is then supplied to the pixels 101 driven in the second mode via the data line 102. Accordingly, all the pixels 101 in the display area AA of the display panel 100 may emit light in a first (e.g., wide) viewing angle by charging the data voltage obtained from the first gamma reference voltage set in the first mode, or may emit light in a second (e.g., narrow) viewing angle by charging the data voltage obtained from the second gamma reference voltage set in the second mode.

The gate driver 120 may be formed in the display panel 100 together with wiring and a TFT array of the pixel array, for example, the gate driver 120 may be implemented as a gate-in-panel (GIP) circuit formed directly in a bezel area BZ on the display panel 100 together with a TFT array of the pixel array. The gate driver 120 may sequentially output the gate signal to the gate lines 103 under the control of the timing controller 130. The gate driver 120 may shift the gate signal by using a shift register to sequentially supply the gate signal to the gate lines 103. In the display panel 100, the gate driver 120 may be disposed on at least one of non-display areas BZ positioned to the left and right of the display area AA, and/or on at least one of non-display areas (e.g., bezel areas) BZ positioned to the upper and lower of the display area AA, or may be disposed at least partially within the display area AA. Embodiments are not limited thereto. As an example, the gate driving circuit 120 may be connected to the display panel 110 in a tape automated bonding (TAB) type, or connected to the display panel 110 in a chip on glass (COG) type or a chip on panel (COP) type, or connected to the display panel 110 in a chip on film (COF) type.

The gate driver 120 may be disposed in the non-display areas BZ. As an example, the gate driver 120 may be disposed in the bezel BZ on both sides of the display panel 100 with the display area AA interposed therebetween to supply gate pulses at both sides of the gate lines 103 in a double feeding manner. In another embodiment, the gate driver 120 may be disposed on either the left or right non-display areas BZ of the display panel 100 to supply gate signals to the gate lines 103 in a single feeding manner. The gate driver 120 outputs the pulses of the gate signals sequentially to the gate lines 103 under the control of the timing controller 130. The gate driver 120 may shift the pulses of the gate signals using a shift register to sequentially supply the signals to the gate lines 103. The gate driver 120 may include a plurality of shift registers that output the pulses of the gate signals.

In the case of a pixel circuit shown in FIG. 2, the gate driver 120 may include a first shift register for sequentially outputting a first gate signal SCAN1, a second shift register for sequentially outputting a second gate signal SCAN2, a third shift register for sequentially outputting a third gate signal EM1 (e.g., light emission control signal, hereinafter referred to as "EM signal"), a fourth shift register for sequentially outputting a fourth gate signal EM2, and a fifth shift register for sequentially outputting a fifth gate signal EM3, but is not limited thereto. The gate driver 120 may include more or less shift registers for sequentially outputting signals according to the structure of the pixel circuit, and at least one of these shift registers could be omitted.

The timing controller 130 may receive digital video data of the input image and a timing signal synchronized with the data from the host system 200. The timing signal may include a vertical synchronization signal Vsync, a horizontal synchronization signal Hsync, a clock CLK, a data enable signal DE, and the like. The vertical synchronization signal Vsync and the horizontal synchronization signal Hsync may be omitted since a vertical period and a horizontal period can be known by counting the data enable signal DE. The horizontal synchronization signal Hsync and the data enable signal DE have a cycle of one horizontal period 1H.

Based on the timing signal Vsync, Hsync, and DE received from the host system 200, the timing controller 130 may generate a data timing control signal for controlling the operation timing of the data driver 110, a MUX control signal for controlling the operation timing of the demultiplexer array 112, and/or a gate timing control signal for controlling the operation timing of the gate driver 120. The data timing control signal may include an enable signal EN shown in FIGS. 6 and 7. The enable signal EN is a control signal that distinguishes the first mode from the second mode. The timing controller 130 controls the operation timing of the display panel driving circuit to synchronize the data driver 110, the demultiplexer array 112, and the gate driver 120.

The MUX control signal and the gate timing control signal outputted from the timing controller 130 may be inputted to the demultiplexer array 112 and the shift registers of the gate driver 120 through the level shifter 140. The level shifter 140 may convert the voltage of the MUX control signal received from the timing controller 130 to have a swing width between the gate-on voltage and the gate-off voltage and supply it to the demultiplexer array 112. The level shifter 140 may receive the gate timing control signal, and generate a shift clock and a start pulse that swings between the gate-on voltage and the gate-off voltage to provide them to the gate driver 120. Embodiments are not limited thereto. As an example, the level shifter 140 may be omitted according to the design. In this case, the MUX control signal and/or the gate timing control signal output from timing controller 130 may be input to the demultiplexer array 112 and the gate driver 120 directly The host system 200 may include a main board of any one of a television (TV) system, a set-top box, a navigation system, a personal computer (PC), a vehicle system, a home theater system, a camera, a mobile terminal, a wearable terminal, and the like. The host system 200 may scale an image signal from a video source to fit the resolution of the display panel 100 and transmit it to the timing controller 130 along with the timing signal. In addition, the host system 200 may transmit, along with the image signal, a mode signal having a different logic value in the first mode and the second mode to the timing controller 130 at least once every frame. The timing controller 130 may generate an enable signal in response to the mode signal.

Figure 3:
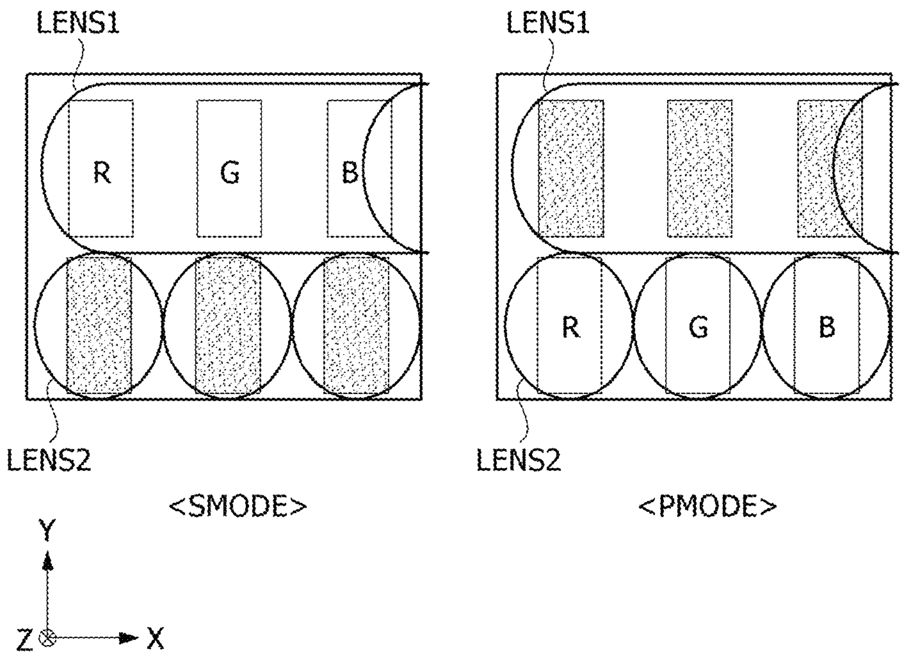
FIG. 3 is a diagram illustrating lenses disposed on first and second light emitting elements shown in FIG. 2.

FIG. 2 is a circuit diagram illustrating a pixel circuit including an internal compensation circuit according to an exemplary embodiment of the present disclosure. The pixel circuit shown in FIG. 2 illustrates an arbitrary sub-pixel circuit disposed on an $N^{th}$ (N being a natural number) pixel line. The pixel circuit may include an internal compensation circuit that senses a threshold voltage Vth of a driving element DT and compensate a data voltage Vdata by the threshold voltage Vth. The pixel circuit of the present disclosure is not limited to FIG. 2. FIG. 3 is a diagram illustrating lenses disposed on first and second light emitting elements shown in FIG. 2.

Referring to FIGS. 2 and 3, the pixel circuit includes a first light emitting element EL1 that emits light in a first mode SMODE, a second light emitting element EL2 that emits light in a second mode PMODE, a driving element DT that drives the first and second light emitting elements EL1 and EL2, a plurality of switch elements T1 to T6, and a capacitor Cst. An example illustrated in FIG. 2 represents 6TIC structure where six transistors and one capacitor are disposed, but embodiments of the present disclosure are not limited to this. For example, 2TIC structure, 3TIC structure, 4TIC structure, 4T2C structure and etc. are also possible. And more or less transistors and capacitors could be included. The driving element DT and the switch elements T1 to T6 may be implemented as p-channel transistors, but are not limited thereto. As an example, at least one of the driving element DT and the switch elements T1 to T6 may be implemented as an n-channel transistor. In the case of an n-channel transistor, the gate-on voltage may be a gate-high voltage, and the gate-off voltage may be a gate-low voltage. In the case of a p-channel transistor, the gate-on voltage may be the gate-low voltage and the gate-off voltage may be the gate-high voltage.

As shown in FIG. 2, the pixel circuit is connected to the data line DL through which the data voltage Vdata is applied, and the gate lines GL1 to GL6 through which the gate signals SCAN1, SCAN2, EM1, EM2, and EM3 are applied.

The pixel circuit is connected to power nodes to which DC voltages (or constant voltages) are applied, such as a first constant voltage node on a first constant voltage line PL1 to which the pixel driving voltage EVDD is applied, a second constant voltage node on a second constant voltage line PL2 to which the cathode voltage EVSS is applied, and a third constant voltage node on a third constant voltage line PL3 to which the reference voltage Vref is applied. On the display panel 100, the power lines connected to the constant voltage nodes may be connected to all pixels in common, without being limited thereto.

The pixel driving voltage EVDD may be set to a voltage that allows the driving element DT to operate in a saturation region. As an example, the pixel driving voltage EVDD may be set to a voltage which is higher than a maximum voltage of the data voltage Vdata. The pixel driving voltage EVDD is higher than the cathode voltage EVSS. The reference voltage Vref may be set to a voltage lower than the pixel driving voltage EVDD and higher than the cathode voltage EVSS. The gate-on voltage VGL may be set to a voltage higher than the pixel driving voltage EVDD and the gate-off voltage VGH may be set to a voltage lower than the cathode voltage EVSS. For example, EVDD=13V, EVSS=0V, Vref=2.5V, VGH=14V, and VGL=−9V, but the present disclosure is not limited thereto. As an example, the gate-off voltage VGH may be set to a voltage equal to or lower than the pixel driving voltage EVDD, and a gate-on voltage VGL may be set to a voltage equal to or higher than the cathode voltage EVSS, as long as the gate-off voltage VGH may turn off the corresponding transistor, and the gate-on voltage VGL may turn on the corresponding transistor. Furthermore, depending on the type of the transistors, as an example, a gate-on voltage may be set to a voltage higher than the gate-off voltage. As an example, the gate-on voltage may be set to a voltage higher than the pixel driving voltage EVDD and the gate-off voltage may be set to a voltage lower than the cathode voltage EVSS, without being limited thereto.

The gate signals SCAN1, SCAN2, EM1, EM2, and EM3 include pulses that swing between the gate-on voltage VGL and the gate-off voltage VGH.

The driving element DT generates a current according to a gate-source voltage Vgs to drive the first and second light emitting elements EL1 and EL2. The driving element DT includes a first electrode connected to the first constant voltage node on a first constant voltage line PL1 to which the pixel driving voltage EVDD is applied, a gate electrode connected to a second node n2, and a second electrode connected to a third node n3.

The first and second light emitting elements EL1 and EL2 may be implemented with OLEDs, LEDs, micro-LEDs, mini-LEDs, etc. The light emitting elements EL1 and EL2 include an anode electrode, a cathode electrode, and an organic/inorganic compound layer formed between the electrodes. The anode electrode of the first light emitting element EL1 is connected to a fourth node n4, and the cathode electrode thereof is connected to the second constant voltage node on a second constant voltage line PL2 to which the cathode voltage EVSS is applied. The anode electrode of the second light emitting element EL2 is connected to a fifth node n5, and the cathode electrode thereof is connected to the second constant voltage node on a second constant voltage line PL2. The organic compound layer may include a hole injection layer (HIL), a hole transport layer (HTL), a light emission layer (EML), an electron transport layer (ETL), and an electron injection layer (EIL), but is not limited thereto. When a voltage is applied to the anode and cathode electrodes of the first and second light emitting elements EL1 and EL2, holes passing through the hole transport layer HTL and electrons passing through the electron transport layer ETL move to the emission layer EML to form excitons. In this case, visible light is emitted from the light emission layer EML. But embodiments are not limited thereto. As an example, at least one of the hole injection layer HIL, the hole transport layer HTL, the electron transport layer ETL, and the electron injection layer EIL may be omitted. As an example, the light emitting elements EL1 and EL2 may be implemented in a tandem structure in which a plurality of light emission layers are stacked. The light emitting elements EL1 and EL2 having the tandem structure may improve the luminance and lifetime of the pixel.

The capacitor Cst is connected between a first node n1 and the second node n2. In a sensing period SEN, the data voltage Vdata compensated by the threshold voltage Vth of the driving element DT is stored in the capacitor Cst. The capacitor Cst maintains the gate-source voltage Vgs of the driving element DT during an emission period EMIS.

A first switch element T1 is connected between the data line DL and the first node n1. The first switch element T1 is turned on in response to the gate-on voltage VGL of the first gate signal SCAN1 to apply the data voltage Vdata of the pixel data to the capacitor Cst. The first switch element T1 includes a first electrode connected to the data line DL, a gate electrode connected to a first gate line GL1 through which the first gate signal SCAN1 is applied, and a second electrode connected to the first node n1.

A second switch element T2 is connected between the second node n2 and the third node n3. The second switch element T2 is turned on in response to the gate-on voltage VGL of the second gate signal SCAN2 to connect the gate electrode of the driving element DT to the second electrode of the driving element DT. The second switch element T2 includes a first electrode connected to the second node n2, a gate electrode connected to a second gate line GL2 through which the second gate signal SCAN2 is applied, and a second electrode connected to the third node n3.

A third-first switch element T31 is connected between the fourth node n4 and the third constant voltage node on a third constant voltage line PL3. The third-first switch element T31 is turned on in response to the gate-on voltage VGL of the second gate signal SCAN2 to connect the fourth node n4 to the third constant voltage node on a third constant voltage line PL3 to which the reference voltage Vref is applied. The third-first switch element T31 includes a first electrode connected to the third constant voltage node on a third constant voltage line PL3, a gate electrode connected to the second gate line GL2 through which the second gate signal SCAN2 is applied, and a second electrode connected to the fourth node n4.

A third-second switch element T32 is connected between the fifth node n5 and the third constant voltage node on a third constant voltage line PL3. The third-second switch element T32 is turned on in response to the gate-on voltage VGL of the second gate signal SCAN2 to connect the fifth node n5 to the third constant voltage node on a third constant voltage line PL3 to which the reference voltage Vref is applied. The third-second switch element T32 includes a first electrode connected to the third constant voltage node on a third constant voltage line PL3, a gate electrode connected to the second gate line GL2 through which the second gate signal SCAN2 is applied, and a second electrode connected to the fifth node n5.

A fourth switch element T4 is connected between the first node n1 and the third constant voltage node on a third constant voltage line PL3. The fourth switch element T4 is turned on in response to the gate-on voltage VGL of the third gate signal EM1 to connect the first node n1 to the third constant voltage node on a third constant voltage line PL3. The fourth switch element T4 includes a first electrode connected to the first node n1, a gate electrode connected to a third gate line GL3 through which the third gate signal EM1 is applied, and a second electrode connected to the third constant voltage node on a third constant voltage line PL3.

A fifth switch element T5 is connected between the third node n3 and the fourth node n4. The fifth switch element T5 is turned on in response to the gate-on voltage VGL of the fourth gate signal EM2 to connect the third node n3 to the fourth node n4. The fifth switch element T5 includes a first electrode connected to the third node n3, a gate electrode connected to a fourth gate line GL4 through which the fourth gate signal EM2 is applied, and a second electrode connected to the fourth node n4.

A sixth switch element T6 is connected between the third node n3 and the fifth node n5. The sixth switch element T6 is turned on in response to the gate-on voltage VGL of the fifth gate signal EM3 to connect the third node n3 to the fifth node n5. The sixth switch element T6 includes a first electrode connected to the third node n3, a gate electrode connected to a fifth gate line GL5 through which the fifth gate signal EM3 is applied, and a second electrode connected to the fifth node n5.

As shown in FIG. 3, a first lens LENS1 may be disposed above the first light emitting element EL1 and refract light emitted from the first light emitting element EL1. The first lens LENS1 may be a semi-cylindrical lens in order to limit a vertical viewing angle and widen a horizontal viewing angle. The first lens LENS1 is long in a first (e.g, horizontal or X-axis) direction of the display panel 100 and short in a second (e.g, vertical or Y-axis) direction thereof. The first lens LENS1 may be semicircle in cross-section of Y-Z plane. The first lens may converge light, emitted from the first light emitting element EL1 in the first mode and traveling in the vertical direction, to narrow the vertical viewing angle and widen the horizontal viewing angle. Due to the first lens LENS1, the vertical viewing angle of the first light emitting element EL1 is comparable to that of the second light emitting element EL2, and the horizontal viewing angle is greater than that of the second light emitting element EL2. In FIG. 3, "R" denotes a red sub-pixel that is emitting light, "G" denotes a green sub-pixel that is emitting light, and "B" denotes a blue sub-pixel that is emitting light. Sub-pixels marked dark in FIG. 3 are non-driven sub-pixels that do not emit light.

Light emitted from a screen of an in-vehicle display disposed on a dashboard of the in-vehicle display may proceed to a front camera disposed at the top front of a room of the vehicle, and the screen of the vehicle display may appear in an image captured by the front camera. The first lens LENS1 may limit the vertical viewing angle of the first light emitting element EL1 that emits light in the first mode to prevent a ghost image of the in-vehicle display screen captured by the front camera.

A second lens LENS2 shown in FIG. 3 may be disposed above the second light emitting element EL2. The second lens LENS2 may be a hemispherical lens that is thicker at the center and thinner toward the edges. The second lens LENS2 may converge light emitted from the second light emitting element EL2 in the second mode to narrow the vertical viewing angle and the horizontal viewing angle of the second light emitting element EL2.

Alternatively, the first lens LENS1 may be disposed correspondingly to the second emission element EL2, and the second lens LENS2 may be disposed correspondingly to the first emission element EL1.

The first and second lenses LENS1 and LENS2 may be implemented as a transparent medium or transparent insulating layer pattern disposed in the display panel 100, but are not limited thereto.

Shapes of the first and second lens are not limited to above shapes, and can be any shape that can refract lights with specific angles. For example, the first lens may have an arc section in the YZ-plane, and the second lens may be a half-ellipsoidal lens, or the second lens may have an arc section in the XZ-plane or YZ-plane.

Figure 4A:
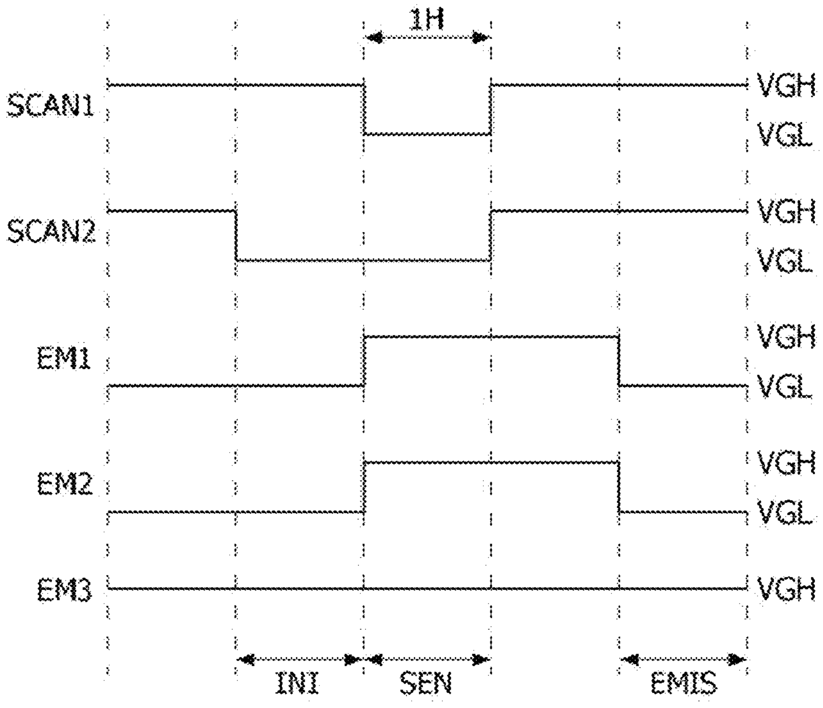
FIGS. 4A and 4B are waveform diagrams illustrating gate signals applied to the pixel circuit shown in FIG. 2.
Figure 4B:
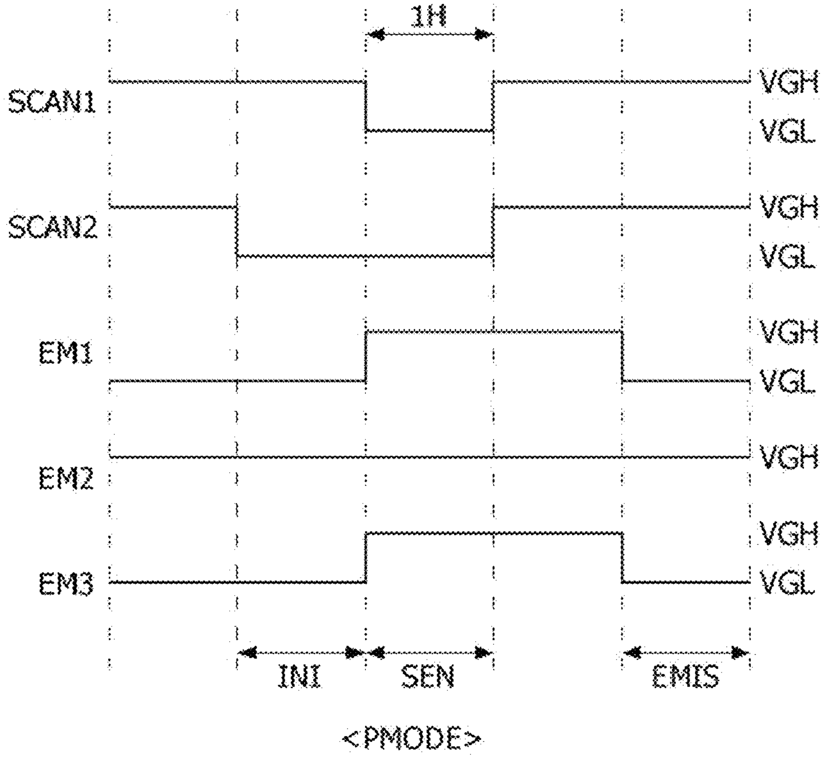

As shown in FIGS. 4A and 4B, the pixel circuit is driven in the order of an initialization period INI, the sensing period SEN, and the emission period EMIS. The initialization period INI, the sensing period SEN, and the emission period EMIS may be determined by the waveforms of the gate signals SCAN1, SCAN2, EM1, EM2, and EM3.

FIGS. 4A and 4B are waveform diagrams illustrating gate signals applied to the pixel circuit shown in FIG. 2. FIG. 4A shows the gate signals generated in the first mode SMODE, and FIG. 4B shows the gate signals generated in the second mode PMODE.

The first, second, and third gate signals SCAN1, SCAN2, and EM1 generated in the first mode SMODE are the same as those generated in the second modePMOD, respectively.

The fourth gate signal EM2 is generated at the gate-on voltage VGL during the initialization period INI and the emission period EMIS in the first mode SMODE. When the fourth gate signal EM2 is generated at the gate-on voltage VGL during the emission period EMIS in the first mode SMODE, the first light emitting element EL1 may be driven in the first mode SMODE to emit light. The fifth gate signal EM3 maintains the gate-off voltage VGH in the first mode SMODE. Therefore, the second light emitting element EL2 is not driven in the first mode SMODE and remains in the off state.

The fifth gate signal EM3 is generated at the gate-on voltage VGL during the initialization period INI and the emission period EMIS in the second mode PMODE. When the fifth gate signal EM3 is generated at the gate-on voltage VGL during the emission period EMIS in the second mode PMODE, the second light emitting element EL2 may be driven in the second mode PMODE to emit light. The fourth gate signal EM2 maintains the gate-off voltage VGH in the second mode PMODE. Therefore, the first light emitting element EL1 is not driven in the second mode PMODE and remains in the off state.

During the initialization period INI of the first mode SMODE, the voltages of the second to fourth gate signals SCAN2, EM1, and EM2 are the gate-on voltage VGL. During the initialization period INI of the first mode SMODE, the voltages of the first and fifth gate signals SCAN1 and EM3 are the gate-off voltage VGH. Therefore, during the initialization period INI of the first mode SMODE, the second, third first, third second, fourth to fifth switch elements T2, T31, T32, T4 to T5 are turned on, while the first and sixth switch elements T1 and T6 are turned off. At this time, the voltages of the first, third, fourth, and fifth nodes n1, n3, n4, and n5 are initialized to the reference voltage Vref, and the capacitor Cst, the gate-source voltage Vgs of the driving element DT, and the anode voltages of the light emitting elements EL1 and EL2 are initialized.

During the initialization period INI of the second mode PMODE, the voltages of the second, third, and fifth gate signals SCAN2, EM1, and EM3 are the gate-on voltage VGL. During the initialization period INI of the second mode PMODE, the voltages of the first and fourth gate signals SCAN1 and EM2 are the gate-off voltage VGH. Therefore, during the initialization period INI of the second mode PMODE, the second, third-first, third-second, fourth, and sixth switch elements T2, T31, T32, T4, and T6 are turned on, while the first and fifth switch elements T1 and T5 are turned off. At this time, the voltages of the first, third, fourth, and fifth nodes n1, n3, n4, and n5 are initialized to the reference voltage Vref, and the capacitor Cst, the gate-source voltage Vgs of the driving element DT, and the anode voltages of the light emitting elements EL1 and EL2 are initialized.

In the first and second modes SMODE and PMODE, the pulse of the first gate signal SCAN1 synchronized with the data voltage Vdata of the pixel data is inputted to the pixel circuit during the sensing period SEN. The voltage of the pulse of the first gate signal SCAN1 is the gate-on voltage VGL for one horizontal period 1H. During the sensing period SEN, the voltage of the second gate signal SCAN2 is the gate-on voltage VGL, and the voltages of the third to fifth gate signals EM1, EM2, and EM3 are the gate-off voltage VGH. Therefore, during the sensing periods SEN of the first mode SMODE and second mode PMODE, the first, second, third first and third second switch elements T1, T2, T31, and T32 are turned on, while the fourth to sixth switch elements T4, T5, and T6 are turned off.

During the sensing period SEN, the data voltage Vdata is applied to the first node n1, and the driving element DT is turned on to raise the voltage of the third node n3. During the sensing period SEN, when the gate voltage of the driving element DT increases and the gate-source voltage Vgs reaches the threshold voltage Vth of the driving element DT, the driving element DT is turned off. At this time, a voltage, Vdata-EVDD-Vth is stored in the capacitor Cst. Here, "Vth" is the threshold voltage Vth of the driving element DT.

A floating time may be set for a predetermined period of time between the sensing period SEN and the emission period EMIN. During the floating time, the voltages of the gate signals SCAN1, SCAN2, EM1, EM2, and EM3 are the gate-off voltage VGH. Thus, during the floating time, the major nodes n1 to n4 float, and the threshold voltage Vth of the driving element DT may be sensed at the pixels in which the threshold voltage sensing time of the driving element DT is insufficient within one horizontal period 1H.

During the emission period EMIS of the first mode SMODE, the voltages of the third and fourth gate signals EM1 and EM2 are the gate-on voltage VGL, and the voltages of the first, second, and fifth gate signals SCAN1, SCAN2, and EM3 are the gate-off voltage VGH. Therefore, during the emission period EMIS of the first mode SMODE, the fourth and fifth switch elements T4 and T5 are turned on along with the driving element DT, while the first, second, third first and third second switch elements T1, T2, T31, and T32 and the sixth switch element T6 are turned off.

During the emission period EMIS of the first mode SMODE, the voltage of the first node n1 changes to the reference voltage Vref and the voltage of the second node n2 changes to Vref−Vdata+EVDD+Vth. During the emission period EMIS of the first mode SMODE, the driving element DT supplies a current generated by the gate-source voltage Vgs to the first light emitting element EL1. The first light emitting element EL1 emits light with a brightness corresponding to a grayscale value of the pixel data during the emission period EMIS of the first mode SMODE, and the light passes through the first lens LENS1 and is emitted at a large angle in the horizontal direction.

During the emission period EMIS of the second mode PMODE, the voltages of the third and fifth gate signals EM1 and EM3 are the gate-on voltage VGL, and the voltages of the first, second, and fourth gate signals SCAN1, SCAN2, and EM2 are the gate-off voltage VGH. Therefore, during the emission period EMIS of the second mode SMODE, the fourth and sixth switch elements T4 and T6 are turned on along with the driving element DT, while the first, second, third first and third second switch elements T1, T2, T31, and T32 and the fifth switch element T5 are turned off.

During the emission period EMIS of the second mode PMODE, the voltage of the first node n1 changes to the reference voltage Vref and the voltage of the second node n2 changes to Vref-Vdata+EVDD+Vth. During the emission period EMIS of the second mode PMODE, the driving element DT supplies a current generated by the gate-source voltage Vgs to the second light emitting element EL2. The second light emitting element EL2 emits light with a brightness corresponding to the grayscale value of the pixel data during the emission period EMIS of the second mode PMODE, and the light is converged by the second lens LENS2 at a small angle in the vertical and horizontal directions.

Figure 5:
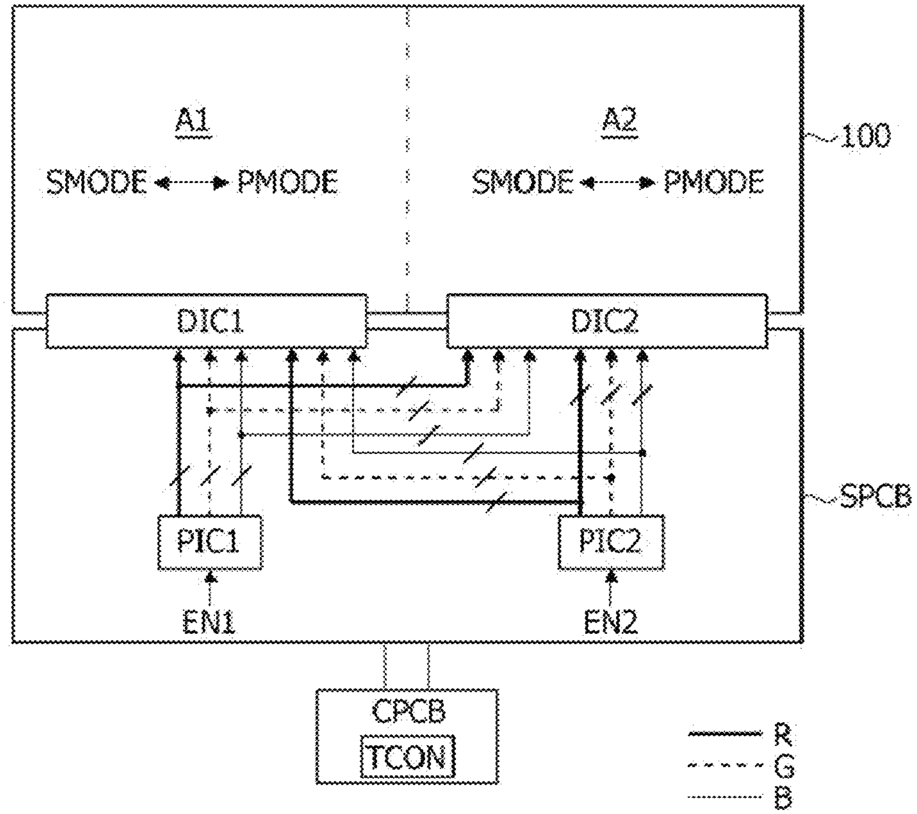
FIG. 5 is a diagram illustrating a connection structure between a source driver IC and a programmable gamma IC in detail according to an exemplary embodiment of the present disclosure.

FIG. 5 is a diagram illustrating a connection structure between a source driver IC and a programmable gamma IC in detail.

Referring to FIG. 5, the display device of the present disclosure includes one or more source driver ICs, and first and second programmable gamma ICs connected to each of the source driver ICs DIC1 and DIC2. Hereinafter, a display device including two source driver ICs DIC1 and DIC2 is taken as an example, but the total number of source driver ICs included in a display device is not limited thereto, and may be any integer larger than two.

The data driver 110 shown in FIG. 1 is integrated into first and second source driver ICs DIC1 and DIC2. The first gamma voltage generator 152 shown in FIG. 1 is integrated into the first programmable gamma IC PIC1, and the second gamma voltage generator 154 is integrated into the second programmable gamma IC PIC2.

The display area AA of the display panel 100 may be divided into first and second display areas A1 and A2. The first source driver IC DIC1 is connected to the data lines of the first display area A1 to supply the data voltage Vdata to the pixels arranged in the first display area A1. The second source driver IC DIC2 is connected to the data lines of the second display area A2 to supply the data voltage Vdata to the pixels arranged in the second display area A2. In case the display device includes more than two source driver ICs DICs, the display area may be divided into a number of display areas corresponding to the number of source driver ICs, each source driver IC may be connected to the data lines of the corresponding display area to supply the data voltage Vdata to the pixels arranged in the corresponding display area, and the first and second programmable gamma ICs may be connected to each source driver IC.

The first and second source driver ICs DIC1 and DIC2 may be mounted on a flexible film substrate and bonded to the display panel 100 and a source printed circuit board (PCB) SPCB through an anisotropic conductive film (ACF), and in particular, wires on the film, in a chip on film (COF) process. Alternatively, each source driver IC may be connected to a bonding pad of the display panel 100 by a tape automated bonding (TAB) method or a chip-on-glass (COG) method. Alternatively, each source driver integrated circuit SDIC may be disposed directly on the display panel 110. Alternatively, each source driver integrated circuit SDIC may be integrated and disposed on the display panel 110 in some cases. The output terminals of the first source driver IC DIC1 through which the data voltage Vdata is outputted may be connected to pads of the data lines disposed in the first display area A1 of the display panel 100. The output terminals of the second source driver IC DIC2 through which the data voltage Vdata is outputted may be connected to pads of the data lines disposed in the second display area A2 of the display panel 100.

The first and second programmable gamma ICs PIC1 and PIC2 may be mounted on the source PCB SPCB. A timing controller TCON is mounted on a control board CPCB. The source PCB SPCB and control board CPCB may be connected through a flexible circuit board such as a flexible flat cable (FFC) or a flexible printed circuit (FPC).

The output terminals of the first and second programmable gamma ICs PIC1 and PIC2 are connected to gamma compensation voltage input terminals of the first source driver IC DIC1. Further, the output terminals of the first and second programmable gamma ICs PIC1 and PIC2 are connected to gamma compensation voltage input terminals of the second source driver IC DIC2. Accordingly, the first programmable gamma IC PIC1 supplies the voltages of the first gamma compensation voltage set to each of the first and second source driver ICs DIC1 and DIC2. The second programmable gamma IC PIC2 supplies the voltages of the second gamma compensation voltage set to each of the first and second source driver ICs DIC1 and DIC2.

The first source driver IC DIC1 is connected to the display panel 100, receives the pixel data to be written to the sub-pixels of the first display area A1 and the gamma compensation voltage for each grayscale, and outputs the data voltage to be supplied to the data lines of the first display area A1. The second source driver IC DIC2 is connected to the display panel 100, receives the pixel data to be written to the sub-pixels of the second display area A2 and the gamma compensation voltage for each grayscale, and outputs the data voltage to be supplied to the data lines of the second display area A2.

The timing controller TCON separates the pixel data of the input image for each display area and supplies the pixel data to be written to the sub-pixels of the first display area A1 to the first source driver IC DIC1, and the pixel data to be written to the sub-pixels of the second display area A2 to the second source driver IC DIC2. The timing controller TCON may control the data voltage Vdata outputted from the source driver ICs DIC1 and DIC2 in the first mode and the second mode to a different voltage for each mode.

The first source driver IC DIC1, under the control of the timing controller 130, converts the pixel data to the data voltage Vdata by using the gamma compensation voltage for each grayscale obtained from the first gamma reference voltage set inputted from the first programmable gamma IC PIC1 in the first mode SMODE and outputs the data voltage Vdata. The first source driver IC DIC1, under the control of the timing controller 130, converts the pixel data to the data voltage Vdata by using the gamma compensation voltage for each grayscale obtained from the second gamma reference voltage set inputted from the second programmable gamma IC PIC2 in the second mode PMODE and outputs the data voltage Vdata.

Accordingly, the pixels of the first display area A1, which the first source driver IC DIC1 is responsible for, may be driven in the first mode SMODE or the second mode PMODE. In at least some grayscales, the data voltage Vdata of the second mode PMODE outputted from the first source driver IC DIC1 may be different from the data voltage Vdata of the first mode SMODE.

The second source driver IC DIC2, under the control of the timing controller 130, converts the pixel data to the data voltage Vdata by using the gamma compensation voltage for each grayscale obtained from the first gamma reference voltage set inputted from the first programmable gamma IC PIC1 in the first mode SMODE and outputs the data voltage Vdata. The second source driver IC DIC2, under the control of the timing controller 130, converts the pixel data to the data voltage Vdata by using the gamma compensation voltage obtained from the second gamma reference voltage set inputted from the second programmable gamma IC PIC2 in the second mode PMODE and outputs the data voltage Vdata. Accordingly, the pixels of the second display area A2, which the second source driver IC DIC2 is responsible for, may be driven in the first mode SMODE or the second mode PMODE. In at least some grayscales, the data voltage Vdata of the second mode PMODE outputted from the second source driver IC DIC2 may be different from the data voltage Vdata of the first mode SMODE.

In the second mode PMODE, light emitted from the second light emitting element EL2 may be converged by the second lens LENS2, resulting in an increase in luminance, so that low grayscale expression may be degraded compared to the first mode SMODE. At least a low grayscale voltage in the voltages of the second gamma reference voltage set may be set to a voltage different from the voltages of the first gamma reference voltage set to improve low grayscale expression in the first mode PMODE.

The timing controller TCON may transmit data to the source driver ICs DIC1 and DIC2 through an embedded clock point to point interface (EPI), a low voltage differential signaling (LVDS) interface, a serial peripheral interface (SP), and the like.

For the EPI, each of the source driver ICs DIC1 and DIC2 may include a clock recovery circuit for clock and data recovery (CDR). The timing controller TCON transmits a clock training pattern (or preamble) signal to the source driver ICs DIC1 and DIC2 so that the phase and frequency of the clock recovered by the source driver ICs DIC1 and DIC2 can be locked. When there are the clock training pattern signal and clock bits in a signal received serially from the timing controller TCON, the source driver ICs DIC1 and DIC2 recover the clock from the clock bits to generate an internal clock.

After the phase and frequency of the internal clock recovered within the source driver ICs DIC1 and DIC2 have been stably locked, the timing controller TCON transmits control data in which control information has been encoded, and the pixel data of the input image to the source driver ICs DIC1 and DIC2. The control data may include the enable signal EN shown in FIGS. 6 and 7.

Figure 6:
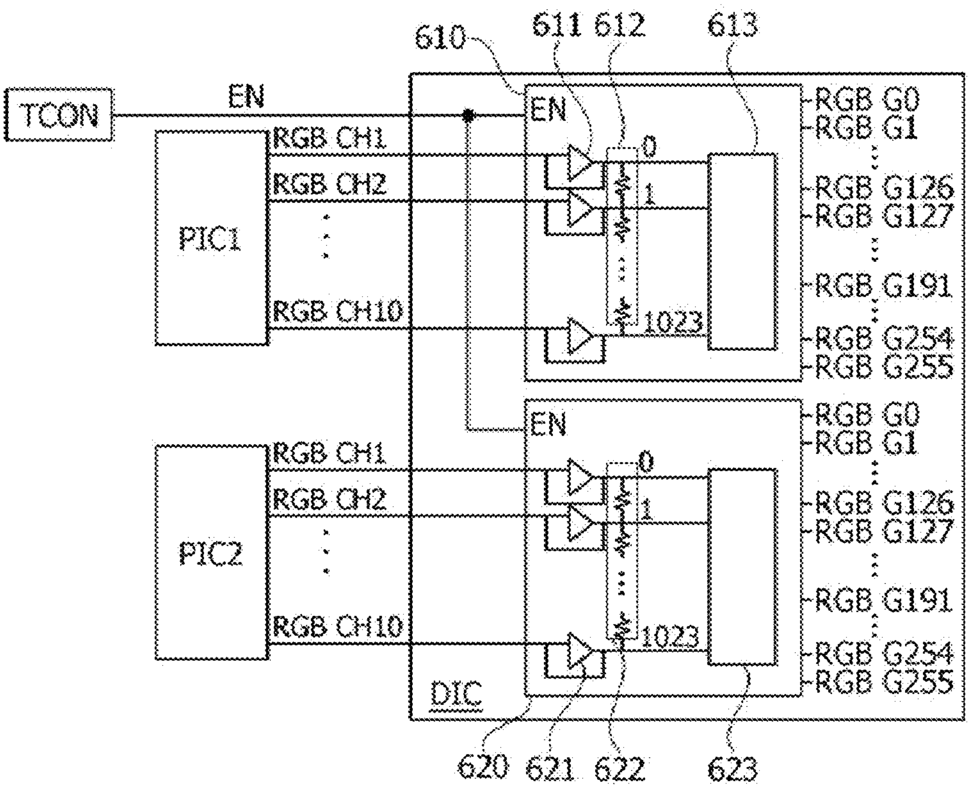
FIG. 6 is a circuit diagram illustrating a gamma compensation voltage generator according to an exemplary embodiment of the present disclosure.

FIG. 6 is a circuit diagram illustrating a gamma compensation voltage generator according to an embodiment of the present disclosure.

Referring to FIG. 6, the first gamma reference voltage set outputted from the first programmable gamma IC PIC1 are set to have different voltages for each color of the sub-pixels. For example, the first gamma reference voltage set includes an R gamma reference voltage set corresponding to the data voltage to be applied to the red sub-pixels, a G gamma reference voltage set corresponding to the data voltage to be applied to the green sub-pixels, and a B gamma reference voltage set corresponding to the data voltage to be applied to the blue sub-pixels.

The first gamma reference voltage set includes a highest voltage, a lowest voltage, and voltages between the highest voltage and the lowest voltage, set differently for each color. The first gamma reference voltage set may include first to tenth gamma reference voltages RGB CH1 to RGB CH10 set at different voltage levels for each color, but is not limited thereto, and may include another number of gamma reference voltages, for example, first to twelfth gamma reference voltages RGB CH1 to RGB CH12.

The second gamma reference voltage set outputted from the second programmable gamma IC PIC2 are set to have different voltages for each color of the sub-pixels. For example, the second gamma reference voltage set includes an R gamma reference voltage set corresponding to the data voltage to be applied to the red sub-pixels, a G gamma reference voltage set corresponding to the data voltage to be applied to the green sub-pixels, and a B gamma reference voltage set corresponding to the data voltage to be applied to the blue sub-pixels.

The second gamma reference voltage set includes a highest voltage, a lowest voltage, and voltages between the highest voltage and the lowest voltage, set differently for each color. The second gamma reference voltage set may include first to tenth gamma reference voltages set at different voltage levels for each color, but is not limited thereto, and may include another number of gamma reference voltages, for example, first to twelfth gamma reference voltages RGB CH1 to RGB CH12.

The source driver IC DIC includes a first gamma compensation voltage generator 610, and a second gamma compensation voltage generator 620. The source driver IC DIC may be the first source driver IC DIC1 or the second source driver IC DIC2 shown in FIG. 5.

The first gamma compensation voltage generator 610 is connected to the first programmable gamma IC PIC1, and may be enabled and driven under the control of the timing controller 130. The first gamma compensation voltage generator 610 is driven in response to a first logic value of the enable signal EN received from the timing controller 130 in the first mode SMODE and outputs gamma compensation voltages RGB G0 to G255 for each grayscale for the first mode SMODE. The gamma compensation voltages for each grayscale include gamma compensation voltages for each grayscale of pixel data (hereinafter referred to as "red data") to be written to the red sub-pixel, gamma compensation voltages for each grayscale of pixel data (hereinafter referred to as "green data") to be written to the green sub-pixel, and gamma compensation voltages for each grayscale of pixel data (hereinafter referred to as "blue data") to be written to the blue sub-pixel.

The first gamma compensation voltage generator 610 includes a voltage divider circuit 612 and a gamma compensation voltage output circuit 613. The voltage divider circuit 612 divides the first to tenth gamma reference voltages RGB CH1 to CH10 inputted through buffers 611 by using a plurality of resistors and outputs the divided voltages. For example, the voltage divider circuit 612 divides the first to tenth gamma reference voltages RGB CH1 to CH10 separated into 10 voltage levels into 1024 voltages 0 to 1023, and outputs first divided voltages including $1^{st}$ to 1024th voltages. Except for separated into 10 voltage levels, the voltage divider circuit 612 may separate each gamma reference voltage into another number of divided voltage levels, such as nine or twelve divided voltage levels, etc.

The gamma compensation voltage output circuit 613 includes a register in which voltage data of each grayscale is set, and a multiplexer that generates by for example selection and outputs one of input voltages based on the voltage data. The gamma compensation voltage output circuit 613 may output a smaller number of gamma compensation voltages for each grayscale than the number of input voltages. The gamma compensation voltage output circuit 613 receives the first divided voltages supplied from the voltage divider circuit 612, selects voltages indicated by the voltage data stored in the register, and outputs first gamma compensation voltages RGB G0 to G255 for each grayscale including 256 voltages for each grayscale as an example. The first gamma compensation voltages for each grayscale are separated by color, and 8-bit pixel data in each color may include 256 grayscale voltages G0 to G255 for example.

Figure 8:
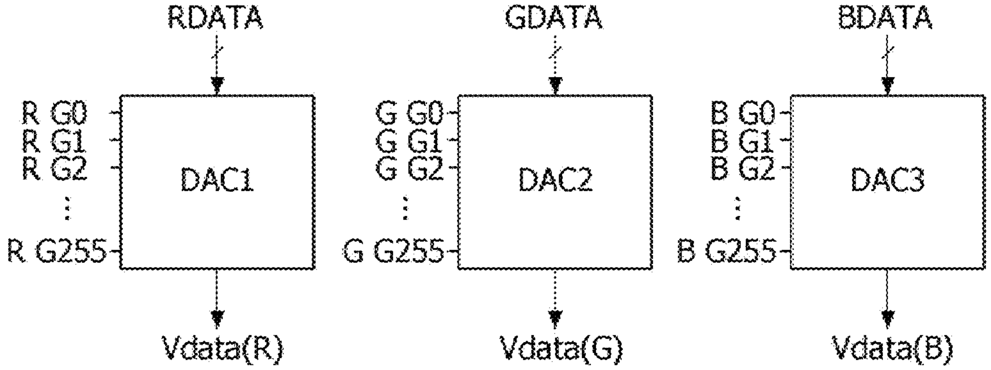
FIG. 8 is a diagram illustrating a digital-to-analog converter that outputs a data voltage according to an exemplary embodiment of the present disclosure.

In the first mode SMODE, the first gamma compensation voltages RGB G0 to G255 for each grayscale outputted from the first gamma compensation voltage generator 610 are supplied to the DACs disposed for each channel of the source driver IC DIC as shown in FIG. 8. The first gamma compensation voltage generator 610 is disabled and not driven in response to a second logic value of the enable signal EN generated and received in the second mode PMODE. Therefore, the first gamma compensation voltage generator 610 outputs the first gamma compensation voltages RGB G0 to G255 for each grayscale in the first mode SMODE and does not output the gamma compensation voltages RGB G0 to G255 for each grayscale in the second mode PMODE.

The second gamma compensation voltage generator 620 may be connected to the second programmable gamma IC PIC2, and may be enabled and driven under the control of the timing controller 130. The second gamma compensation voltage generator 620 is driven in response to the second logic value of the enable signal EN received from the timing controller 130 in the second mode PMODE to output the gamma compensation voltages RGB G0 to G255 for each grayscale for the second mode PMODE. The gamma compensation voltages for each grayscale include gamma compensation voltages for each grayscale of the red data, gamma compensation voltages for each grayscale of the green data, and gamma compensation voltages for each grayscale of the blue data. The total number of gamma compensation voltages output by the each gamma compensation voltage generator 256 is merely an example, and may be more or less than 256. Meanwhile, the gamma compensation voltages for each grayscale may include gamma compensation voltages for each grayscale of pixel data to be written to sub-pixels of other color systems such as purple red (Magenta), cyan (Cyan), and yellowish green YG (or yellow) or white, red, green, or blue.

The second gamma compensation voltage generator 620 includes a voltage divider circuit 622 and a gamma compensation voltage output circuit 623. The voltage divider circuit 622 divides the first to tenth gamma reference voltages RGB CH1 to CH10 inputted through buffers 621 by using a plurality of resistors and outputs the divided voltages. For example, the voltage divider circuit 622 divides the first to tenth gamma reference voltages RGB CH1 to CH10 separated into 10 voltage levels into 1024 voltages, and outputs second divided voltages 0 to 1023 including 1$^{st}$ to 1024th voltages. Except for separated into 10 voltage levels, the voltage divider circuit 612 may separate each gamma reference voltage into another number of divided voltage levels, such as nine or twelve divided voltage levels, etc.

The gamma compensation voltage output circuit 623 includes a register in which voltage data of each grayscale is set, and a multiplexer that generates by for example selection and outputs one of input voltages based on the voltage data. The gamma compensation voltage output circuit 623 may output a smaller number of gamma compensation voltages for each grayscale than the number of input voltages. The gamma compensation voltage output circuit 623 receives the second divided voltages supplied from the voltage divider circuit 622, selects voltages indicated by the voltage data stored in the register, and outputs second gamma compensation voltages RGB G0 to G255 for each grayscale including 256 voltages for each grayscale as an example. The second gamma compensation voltages for each grayscale are separated by color, and 8-bit pixel data in each color may include 256 grayscale voltages G0 to G255 for example.

In the second mode PMODE, the second gamma compensation voltages RGB G0 to G255 for each grayscale outputted from the second gamma compensation voltage generator 620 are supplied to the DACs disposed for each channel of the source driver IC DIC as shown in FIG. 8. The second gamma compensation voltage generator 620 is disabled and not driven in response to the first logic value of the enable signal EN generated and received in the first mode SMODE. Therefore, the second gamma compensation voltage generator 620 outputs the second gamma compensation voltages RGB G0 to G255 for each grayscale in the second mode PMODE and does not output the gamma compensation voltages RGB G0 to G255 for each grayscale in the first mode SMODE.

Figure 7:
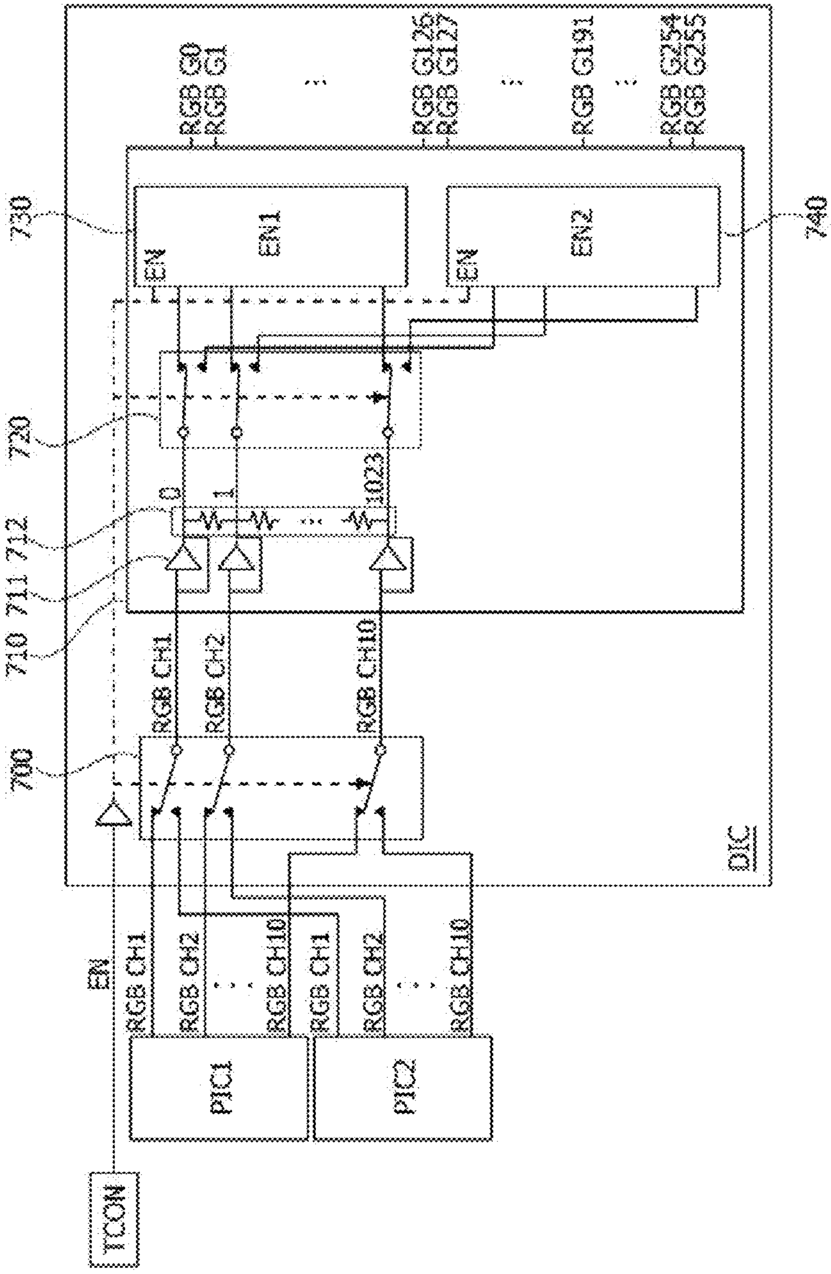
FIG. 7 is a circuit diagram illustrating a gamma compensation voltage generator according to another exemplary embodiment of the present disclosure.

FIG. 7 is a circuit diagram illustrating a gamma compensation voltage generator according to another embodiment of the present disclosure. In FIG. 7, components that are substantially the same as those of the above-described embodiments are designated with the same reference numerals, and a detailed description thereof is omitted.

Referring to FIG. 7, the source driver IC DIC may include a first voltage selector 700, a voltage divider circuit 712, a second voltage selector 720, a first gamma compensation voltage output circuit 730, and a second gamma compensation voltage output circuit 740.

The first voltage selector 700 includes a first group of input terminals connected to the output terminals of the first programmable gamma IC PIC1, a second group of input terminals connected to the output terminals of the second programmable gamma IC PIC2, and output terminals connected to the voltage divider circuit 712 via buffers 711.

The first voltage selector 700 includes a plurality of switch elements that are turned on/off in response to the enable signal EN from the timing controller 130. The first voltage selector 700 outputs the first to tenth gamma reference voltages RGB CH1 to CH10 inputted from the first programmable gamma IC PIC1 in response to the first logic value of the enable signal EN in the first mode SMODE. The first voltage selector 700 outputs the first to tenth gamma reference voltages RGB CH1 to CH10 inputted from the second programmable gamma IC PIC2 in response to the second logic value of the enable signal EN in the second mode PMODE.

The voltage divider circuit 712 divides the first to tenth gamma reference voltages RGB CH1 to CH10 inputted through the buffers 711 by using a plurality of resistors and outputs the divided voltages. For example, the voltage divider circuit 712 divides the first to tenth gamma reference voltages RGB CH1 to CH10 separated into 10 voltage levels into 1024 voltages, and outputs the divided voltages 0 to 1023.

The second voltage selector 720 includes a plurality of switch elements that are turned on/off in response to the enable signal EN from the timing controller 130. The second voltage selector 720 outputs 1$^{st}$ to 1024th voltages from the voltage divider circuit 712 to the first gamma compensation voltage output circuit 730 in response to the first logic value of the enable signal EN in the first mode SMODE. The second voltage selector 720 outputs the 1$^{st}$ to 1024th voltages from the voltage divider circuit 712 to the second gamma compensation voltage output circuit 740 in response to the second logic value of the enable signal EN in the second mode PMODE.

The first gamma compensation voltage output circuit 730 includes a register in which voltage data of each grayscale is set, and a multiplexer that selects and outputs one of input voltages based on the voltage data. The first gamma compensation voltage output circuit 730 may output a smaller number of gamma compensation voltages for each grayscale than the number of input voltages. The first gamma compensation voltage output circuit 730 is driven in the first mode SMODE in response to the first logic value of the enable signal EN. In the first mode SMODE, the first gamma compensation voltage output circuit 730 receives the $1^{st}$ to $1024^{th}$ voltages from the voltage divider circuit 712, selects voltages indicated by the voltage data stored in the register, and outputs the gamma compensation voltages RGB G0 to G255 for each grayscale. The gamma compensation voltages for each grayscale are separated by color, and 8-bit pixel data in each color may include 256 grayscale voltages G0 to G255.

In the first mode SMODE, the gamma compensation voltages RGB G0 to G255 for each grayscale outputted from the first gamma compensation voltage output circuit 730 are supplied to the DACs disposed for each channel of the source driver IC DIC as shown in FIG. 8. The first gamma compensation voltage output circuit 730 is disabled and not driven in response to the second logic value of the enable signal EN generated and received in the second mode PMODE.

The second gamma compensation voltage output circuit 740 includes a register in which voltage data for each grayscale is set, and a multiplexer that selects and outputs one of input voltages based on the voltage data. The second gamma compensation voltage output circuit 740 may output a smaller number of gamma compensation voltages for each grayscale than the number of input voltages. The second gamma compensation voltage output circuit 740 is driven in the second mode PMODE in response to the second logic value of the enable signal EN. In the second mode PMODE, the second gamma compensation voltage output circuit 740 receives the $1^{st}$ to $1024^{th}$ voltages from the voltage divider circuit 712, selects voltages indicated by the voltage data stored in the register, and outputs the gamma compensation voltages RGB G0 to G255 for each grayscale. The gamma compensation voltages for each grayscale are separated by color, and 8-bit pixel data in each color may include 256 grayscale voltages G0 to G255.

In the second mode PMODE, the gamma compensation voltages RGB G0 to G255 for each grayscale outputted from the second gamma compensation voltage output circuit 740 are supplied to the DACs disposed for each channel of the source driver IC DIC as shown in FIG. 8. The second gamma compensation voltage output circuit 740 is disabled and not driven in response to the first logic value of the enable signal EN generated and received in the first mode SMODE.

Although embodiments of present disclosure are described based on the first mode SMODE and second mode PMODE, the display panel 100 can be configured to operate in much more modes in addition to the above two modes (e.g., 3 or more modes).

FIG. 8 is a diagram illustrating a digital-to-analog converter that outputs a data voltage.

Referring to FIG. 8, the source driver IC DIC includes DACs DAC1, DAC2, and DAC3 disposed on channels outputting the data voltage Vdata. Each of the DACs DAC1, DAC2, and DAC3 receives the pixel data as digital data, and the gamma compensation voltages RGB G0 to G255 for each grayscale shown in FIGS. 6 and 7. Each of the DACs DAC1, DAC2, and DAC3 selects a gamma compensation voltage corresponding to the grayscale value of the pixel data and outputs it as the data voltage Vdata. The number of DACs included in the source driver IC DIC is not limited to three. In case of another color system is adopted such as CMYK, another number of DACs may be included in the source driver IC DIC The DAC DAC1 of a first channel may receive red data RDATA and the gamma compensation voltages R G0 to G255 for each grayscale of the red data, and output the data voltage Vdata(R) to be applied to the red sub-pixel. The DAC DAC2 of a second channel may receive green data GDATA and the gamma compensation voltages G G0~G255 for each grayscale of the green data, and output the data voltage Vdata(G) to be applied to the green sub-pixel. The DAC DAC3 of a third channel may receive blue data BDATA and the gamma compensation voltages B G0~G255 for each grayscale of the blue data, and output the data voltage Vdata(B) to be applied to the blue sub-pixel.

In the first mode SMODE, the gamma compensation voltages RGB G0 to G255 for each grayscale obtained from the first gamma reference voltage set are supplied to the DACs DAC1, DAC2, and DAC3. In the second mode PMODE, the gamma compensation voltages RGB G0 to G255 for each grayscale obtained from the second gamma reference voltage set are supplied to the DACs DAC1, DAC2, and DAC3.

The objects to be achieved by the present disclosure, the means for achieving the objects, and advantages and effects of the present disclosure described above do not specify essential features of the claims, and thus, the scope of the claims is not limited to the disclosure of the present disclosure.

It will be apparent to those skilled in the art that various modifications and variations can be made in the display device of the present disclosure without departing from the technical idea or scope of the disclosure. Thus, it is intended that the present disclosure cover the modifications and variations of this disclosure provided they come within the scope of the appended claims and their equivalents.

What is claimed is:

1. A display device, comprising:

a display panel including at least two display areas in which a plurality of data lines, a plurality of gate lines, and a plurality of sub-pixels are disposed;

a source driver IC for each display area, the source driver IC connected to the display panel and configured to receive pixel data to be written into sub-pixels of the display area and a gamma compensation voltage for each grayscale and output a data voltage to be supplied to the data lines of the display area;

a first programmable gamma integrated circuit (IC) configured to supply a first gamma reference voltage set to each source driver IC; and a second programmable gamma IC configured to supply a second gamma reference voltage set to each source driver IC, wherein each source driver IC outputs, as the data voltage, a voltage acquired based on first gamma compensation voltages for each grayscale obtained from the first gamma reference voltage set in a first mode, and outputs, as the data voltage, a voltage acquired based on second gamma compensation voltages for each grayscale obtained from the second gamma reference voltage set in a second mode.

2. The display device of claim 1, wherein each of the first and second gamma reference voltage sets is disposed to have different voltages for each color of the sub-pixels.

3. The display device of claim 1, wherein each of the sub-pixels disposed in each display area emits light at a first viewing angle in the first mode, and emits light at a second viewing angle smaller than the first viewing angle in the second mode.

4. The display device of claim 1, wherein each of the sub-pixels includes:

a first light emitting element disposed corresponding to a first lens;

a second light emitting element disposed corresponding to a second lens; and a driving element configured to drive the first light emitting element in the first mode and drive the second light emitting element in the second mode.

5. The display device of claim 4, wherein the first lens is configured to widen a viewing angle in a first direction and limit a viewing angle in a second direction, and the second lens is configured to limit viewing angles in both the first and second directions.

6. The display device of claim 5, wherein the first lens includes a semi-cylindrical lens that is long in the first direction and short in the second direction, and the second lens includes a hemispherical condensing lens.

7. The display device of claim 1, further comprising:

a timing controller configured to transmit the pixel data to be written into the sub-pixels of each display area to the source driver IC corresponding to the display area, wherein the timing controller outputs an enable signal that controls the data voltage outputted from each source driver IC for each mode.

8. The display device of claim 7, wherein each source driver IC includes:

a first gamma compensation voltage generator configured to be driven in response to a first logic value of the enable signal to receive voltages of the first gamma reference voltage set and output the first gamma compensation voltages for each grayscale in the first mode, and configured to be disabled in response to a second logic value of the enable signal; and a second gamma compensation voltage generator configured to be driven in response to the second logic value of the enable signal to receive voltages of the second gamma reference voltage set and output the second gamma compensation voltages for each grayscale in the second mode, and configured to be disabled in response to the first logic value of the enable signal.

9. The display device of claim 8, wherein the first gamma compensation voltage generator includes:

a first voltage divider circuit configured to divide the voltages of the first gamma reference voltage set inputted in the first mode and output first divided voltages; and a first gamma compensation voltage output circuit configured to receive the first divided voltages in the first mode and output the first gamma compensation voltages for each grayscale based on the first divided voltages, and wherein the second gamma compensation voltage generator includes:

a second voltage divider circuit configured to divide the voltages of the second gamma reference voltage set inputted in the second mode and output second divided voltages; and a second gamma compensation voltage output circuit configured to receive the second divided voltages in the second mode and output the second gamma compensation voltages for each grayscale based on the second divided voltages.

10. The display device of claim 9, wherein the number of the first divided voltages is greater than the number of the voltages of the first gamma reference voltage set, and the number of the first gamma compensation voltages for each grayscale is less than the number of the first divided voltages, and wherein the number of second divided voltages is greater than the number of the voltages of the second gamma reference voltage set, and the number of the second gamma compensation voltages for each grayscale is less than the number of the second divided voltages.

11. The display device of claim 7, wherein each source driver IC includes:

a first voltage selector configured to output voltages of the first gamma reference voltage set from the first programmable gamma IC in response to a first logic value of the enable signal, and output voltages of the second gamma reference voltage set from the second programmable gamma IC in response to a second logic value of the enable signal;

a voltage divider circuit configured to divide the voltages of the first gamma reference voltage set supplied from the first voltage selector in the first mode to output first divided voltages, and divide the voltages of the second gamma reference voltage set supplied from the first voltage selector in the second mode to output second divided voltages;

a first gamma compensation voltage output circuit configured to output the first gamma compensation voltages for each grayscale based on the first divided voltages in response to the first logic value of the enable signal in the first mode:

a second gamma compensation voltage output circuit configured to output the second gamma compensation voltages for each grayscale based on the second divided voltages in response to the second logic value of the enable signal in the second mode; and a second voltage selector configured to supply the first divided voltages to the first gamma compensation voltage output circuit in response to the first logic value of the enable signal, and supply the second divided voltages to the second gamma compensation voltage output circuit in response to the second logic value of the enable signal.

12. The display device of claim 4, wherein each sub-pixel further comprises:

a first switch element configured to apply a data voltage to a first electrode of a capacitor in response to a first gate signal;

a second switch element configured to connect a gate electrode of the driving element to a second electrode of the driving element in response to a second gate signal;

a third switch element configured to apply a reference voltage to a first electrode of the first light emitting element in response to the second gate signal;

a seventh switch element configured to apply the reference voltage to a first electrode of the second light emitting element in response to the second gate signal;

a fourth switch element configured to apply the reference voltage to the first electrode of the capacitor in response to a third gate signal;

a fifth switch element configured to connect the second electrode of the driving element to the first electrode of the first light emitting element in response to the second gate signal:

a fifth switch element configured to connect the second electrode of the driving element to the first electrode of the first light emitting element in response to a fourth gate signal:

a sixth switch element configured to connect the second electrode of the driving element to the first electrode of the second light emitting element in response to a fifth gate signal; and the capacitor connected between the first switch element and the gate electrode of the driving element.

13. A display device, comprising:

a display panel including a plurality of display areas in which a plurality of data lines, a plurality of gate lines, and a plurality of sub-pixels are disposed:

a source driver IC for each display area, the source driver IC connected to the display panel and configured to receive pixel data to be written into sub-pixels of the display area and a gamma compensation voltage for each grayscale and output a data voltage to be supplied to the data lines of the display area:

a plurality of programmable gamma integrated circuits (IC) each configured to supply a gamma reference voltage set corresponding to a respective display mode to each source driver IC; and wherein each of the source driver ICs outputs, as the data voltage, a voltage acquired based on gamma compensation voltages for each grayscale obtained from a respective gamma reference voltage set.

* * * * *